(12) United States Patent
Lee et al.

(10) Patent No.: US 8,345,204 B2
(45) Date of Patent: Jan. 1, 2013

(54) LIQUID CRYSTAL DISPLAY

(75) Inventors: Jaekyun Lee, Gyeonggi-do (KR);
Jaeyoung Oh, Gyeonggi-do (KR);
Dongsu Shin, Gyeonggi-do (KR);
Daejung Choi, Gyeonggi-do (KR);
Sanghun Choi, Seoul (KR)

(73) Assignee: LG Display Co., Ltd., Seoul (KR)

( * ) Notice: Subject to any disclaimer, the term of this patent is extended or adjusted under 35 U.S.C. 154(b) by 673 days.

(21) Appl. No.: 12/578,963

(22) Filed: Oct. 14, 2009

(65) Prior Publication Data

US 2010/0110359 A1 May 6, 2010

(30) Foreign Application Priority Data

Oct. 30, 2008 (KR) .................. 10-2008-0107355

(51) Int. Cl.
*G02F 1/1343* (2006.01)

(52) U.S. Cl. .................. 349/139; 349/149; 349/143

(58) Field of Classification Search .................. 349/38, 349/39, 139, 141, 143
See application file for complete search history.

(56) References Cited

U.S. PATENT DOCUMENTS

| | | | | |
|---|---|---|---|---|
| 4,965,565 A | * | 10/1990 | Noguchi | .................. 345/93 |
| 7,884,912 B2 | * | 2/2011 | Seok et al. | .................. 349/141 |
| 2001/0015715 A1 | | 8/2001 | Hebiguchi et al. | |
| 2003/0227590 A1 | | 12/2003 | Oke et al. | |
| 2006/0145990 A1 | | 7/2006 | Kim et al. | |
| 2009/0040166 A1 | | 2/2009 | Lee et al. | |

FOREIGN PATENT DOCUMENTS

| | | |
|---|---|---|
| EP | 2 023 195 | 2/2009 |
| EP | 2 023 195 A1 | 2/2009 |
| KR | 10-2005-0111965 | 11/2005 |

\* cited by examiner

*Primary Examiner* — Richard Kim
*Assistant Examiner* — David Chung
(74) *Attorney, Agent, or Firm* — Morgan, Lewis & Bockius LLP

(57) ABSTRACT

A liquid crystal display is provided. In the liquid crystal display, a common line includes an edge common line that is formed in a non-display area outside a display area of a liquid crystal display panel to receive a common voltage through a plurality of input units, a plurality of pixel common line patterns that are formed along edges of each of subpixels to be electrically connected to one another, and a plurality of longitudinal common lines that is electrically connected to the edge common line to apply the common voltage to the pixel common line patterns. Each of the pixel common line patterns has a mesh structure and is connected to common electrodes of the subpixels. Each of the longitudinal common lines is formed between two horizontally adjacent pixels in a direction parallel to the data lines.

22 Claims, 18 Drawing Sheets

LIQUID CRYSTAL DISPLAY

This application claims the benefit of Korea Patent No. 10-2008-0107355 filed on Oct. 30, 2008, the entire contents of which is incorporated Application herein by reference for all purposes as if fully set forth herein.

BACKGROUND OF THE INVENTION

1. Field of the Invention

Embodiments of the invention relate to a liquid crystal display capable of reducing a distortion of a common voltage.

2. Discussion of the Related Art

Active matrix type liquid crystal displays display a moving picture using a thin film transistor (TFT) as a switching element. The active matrix type liquid crystal displays have been implemented in televisions as well as display devices in portable devices, such as office equipment and computers, because of the thin profile of an active matrix type liquid crystal displays. Accordingly, cathode ray tubes (CRT) are being rapidly replaced by active matrix type liquid crystal displays.

In the active matrix type liquid crystal displays, a data voltage is applied to a pixel electrode, and a common voltage is applied to a common electrode opposite the pixel electrode. The common electrodes are connected in parallel to common lines. Liquid crystal cells are driven by the voltages applied to the pixel electrodes and the common electrodes.

However, the common voltage is easily distorted by a resistance of the common line or a deviation of the common voltage over the entire surface of a liquid crystal display panel depending on a structure of the common line. For example, in a liquid crystal display in which as many common lines as the number of horizontal lines (i.e., a vertical resolution) are formed parallel to gate lines, because a data voltage is simultaneously applied to pixels of 1 horizontal line through the supply of scan pulses, a load of the common line opposite the pixels increases. Because the load of the common line depends on an amount of RC delay defined by a multiplication of a resistance and a parasitic capacitance of the common line, the resistance of the common lines has to be reduced so as to reduce the amount of RC delay. However, as shown in FIG. 1, because a related art liquid crystal display has a structure to receive a common voltage Vcom through only two input units, it is limited to a reduction in resistances of common lines. As a result, in the related art liquid crystal display, as shown in FIG. 2A, the common voltage Vcom is not kept constant and is affected by a scan pulse SP or a data voltage Vdata. Hence, a ripple phenomenon is generated in the common voltage Vcom. The ripple of the common voltage Vcom is a main cause generating a horizontal crosstalk when a specific data pattern is displayed on the screen as shown in FIG. 3A.

In the related art liquid crystal display, the resistance of the common line increases because of the structure of the common line shown in FIG. 1, as the common line goes from right and left sides to a middle portion of the liquid crystal display panel. Therefore, as shown in FIG. 2B, a deviation of the common voltage Vcom over the entire surface of the liquid crystal display panel is caused. The deviation of the common voltage Vcom, as shown in FIG. 3B, causes a luminance difference between upper and lower portions of the liquid crystal display panel and a flicker, and also accumulates a DC component inside the panel to cause image sticking. In most of liquid crystal displays, common lines formed at edges (i.e., a non-display area outside a pixel array) of a panel have wide width so as to reduce resistances of the common lines. However, it is limited to a reduction in the resistances of the common lines because of the limited size of the non-display area. Further, there is a relatively large deviation among resistances of the common lines depending on locations of the common lines.

Further, because as many common lines as the number of horizontal lines are needed in the related art liquid crystal display, it is limited to an increase in a luminance by increasing an aperture ratio of a pixel array.

SUMMARY OF THE INVENTION

Embodiments of the invention provide a liquid crystal display capable of reducing a distortion of a common voltage by optimally disposing common lines.

Embodiments of the invention also provide a liquid crystal display capable of increasing an aperture ratio of a pixel array by optimally disposing common lines.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect, there is a liquid crystal display comprising a liquid crystal display panel including a display area where pixels are arranged in a matrix format and a plurality of data lines and a plurality of gate lines are formed to cross each other, an edge common line that is formed in a non-display area outside the display area to receive a common voltage through a plurality of input units, a plurality of pixel common line patterns that are formed along edges of each of subpixels constituting each of the pixels and are electrically connected to one another, each of the pixel common line patterns having a mesh structure, the pixel common line patterns being connected to common electrodes of the subpixels, and a plurality of longitudinal common lines that are electrically connected to the edge common line to apply the common voltage to the pixel common line patterns, each of the longitudinal common lines being formed between two horizontally adjacent pixels in a direction parallel to the data lines.

The liquid crystal display further comprises a plurality of data drive integrated circuits (ICs) for driving the data lines, wherein the plurality of input units include a plurality of common voltage input pads connected to dummy channels of each of the data drive ICs.

Two gate lines and two data lines are assigned to each of the pixels.

The pixels include a first pixel between a first gate line and a second gate line vertically adjacent to the first gate line, the first pixel including a first color subpixel, a second color subpixel, and a third color subpixel that are connected to the first and second gate lines in zigzags, and a second pixel between a third gate line vertically adjacent to the second gate line and a fourth gate line vertically adjacent to the third gate line, the second pixel including a first color subpixel, a second color subpixel, and a third color subpixel that are connected to the third and fourth gate lines in zigzags, the second pixel being vertically adjacent to the first pixel, wherein a first data line of the two data lines assigned to each pixel is formed between the first and second color subpixels of the first pixel and between the first and second color subpixels of the second pixel, and a second data line of the two data lines is formed between the second and third color subpixels of the first pixel and between the second and third color subpixels of the second pixel.

The first color subpixel and the third color subpixel of the first pixel are connected to the second gate line, and the second color subpixel of the first pixel is connected to the first gate line. The first color subpixel and the third color subpixel of the second pixel are connected to the third gate line, and the second color subpixel of the second pixel is connected to the fourth gate line.

The first color subpixel of each of the first and second pixels includes a first common electrode including a plurality of first fingers inclining to the data lines and a first connection portion that partially overlaps a first longitudinal common line and the pixel common line pattern to connect the first fingers to each other, and a first pixel electrode including a plurality of second fingers, that incline to the data lines and are opposite to the first fingers on the same plane as the first fingers, and a second connection portion that partially overlaps the pixel common line pattern to connect the second fingers to each other. The first common electrode is connected to the first longitudinal common line through a first common electrode contact hole and is connected to the pixel common line pattern through a second common electrode contact hole.

The second color subpixel of each of the first and second pixels includes a second common electrode including a plurality of third fingers inclining to the data lines and a third connection portion that partially overlaps the pixel common line pattern to connect the third fingers to each other and a second pixel electrode including a plurality of fourth fingers, that incline to the data lines and are opposite to the third fingers on the same plane as the third fingers, and a fourth connection portion that partially overlaps the pixel common line pattern to connect the fourth fingers to each other. The second common electrode is connected to the pixel common line pattern through a third common electrode contact hole.

The third color subpixel of each of the first and second pixels includes a third common electrode including a plurality of fifth fingers inclining to the data lines and a fifth connection portion that partially overlaps a second longitudinal common line and the pixel common line pattern to connect the fifth fingers to each other and a third pixel electrode including a plurality of sixth fingers, that incline to the data lines and are opposite to the fifth fingers on the same plane as the fifth fingers, and a sixth connection portion that partially overlaps the pixel common line pattern to connect the sixth fingers to each other. The third common electrode is connected to the second longitudinal common line through a fourth common electrode contact hole and is connected to the pixel common line pattern through a fifth common electrode contact hole.

The first color subpixel of each of the first and second pixels includes a first common electrode including a plurality of first fingers parallel to the data lines and a first connection portion that partially overlaps a first longitudinal common line and the pixel common line pattern to connect the first fingers to each other and a first pixel electrode including a plurality of second fingers, that are formed parallel to the data lines and are opposite to the first fingers on the same plane as the first fingers, and a second connection portion that partially overlaps the pixel common line pattern to connect the second fingers to each other. The first common electrode is connected to the first longitudinal common line through a first common electrode contact hole and is connected to the pixel common line pattern through a second common electrode contact hole.

The second color subpixel of each of the first and second pixels includes a second common electrode including a plurality of third fingers parallel to the data lines and a third connection portion that partially overlaps the pixel common line pattern to connect the third fingers to each other and a second pixel electrode including a plurality of fourth fingers, that are formed parallel to the data lines and are opposite to the third fingers on the same plane as the third fingers, and a fourth connection portion that partially overlaps the pixel common line pattern to connect the fourth fingers to each other. The second common electrode is connected to the pixel common line pattern through a third common electrode contact hole.

The third color subpixel of each of the first and second pixels includes a third common electrode including a plurality of fifth fingers parallel to the data lines and a fifth connection portion that partially overlaps a second longitudinal common line and the pixel common line pattern to connect the fifth fingers to each other and a third pixel electrode including a plurality of sixth fingers, that are formed parallel to the data lines and are opposite to the fifth fingers on the same plane as the fifth fingers, and a sixth connection portion that partially overlaps the pixel common line pattern to connect the sixth fingers to each other. The third common electrode is connected to the second longitudinal common line through a fourth common electrode contact hole and is connected to the pixel common line pattern through a fifth common electrode contact hole.

The first color subpixel of each of the first and second pixels further includes a first transparent electrode pattern that electrically connects the first longitudinal common line to the pixel common line pattern through a first common line contact hole exposing the first longitudinal common line and a second common line contact hole exposing the pixel common line pattern. The third color subpixel of each of the first and second pixels further includes a second transparent electrode pattern that electrically connects the second longitudinal common line to the pixel common line pattern through a third common line contact hole exposing the second longitudinal common line and a fourth common line contact hole exposing the pixel common line pattern.

Scan pulses each having a width of a half horizontal period are sequentially generated and are supplied to the gate lines. The data drive IC inverts polarities of data voltages supplied to the data lines in synchronization with the generation of the scan pulses.

Scan pulses each having a width of a half horizontal period are sequentially generated and are supplied to odd-numbered gate lines of the gate lines during a first half frame period, and scan pulses each having a width of a half horizontal period are sequentially generated and are supplied to even-numbered gate lines of the gate lines during a second half frame period. The data drive IC inverts polarities of data voltages supplied to the data lines in synchronization with the generation of a first scan pulse of the scan pulses supplied to the odd-numbered gate lines and the generation of a first scan pulse of the scan pulses supplied to the even-numbered gate lines.

The edge common line and the pixel common line pattern have the same metal pattern as the gate lines, wherein the longitudinal common lines have the same metal pattern as the data lines.

The longitudinal common lines comprises a plurality of first longitudinal common lines and a plurality of second longitudinal common lines, wherein the first and the second longitudinal common lines are alternately formed between a first pixel and a second pixel horizontally adjacent to the first pixel.

Each of the first longitudinal common lines is electrically connected to the edge common line through first and second common line contact holes.

In the first common line contact hole, a portion of the edge common line not overlapping the first longitudinal common line is connected to a first connection pattern; in the second common line contact hole, a portion of the first longitudinal common line overlapping the edge common line is connected to the first connection pattern.

Each of the second longitudinal common lines is electrically connected to the edge common line through third and fourth common line contact holes.

In the third common line contact hole, a portion of the edge common line not overlapping the second longitudinal common line is connected to a second connection pattern; in the fourth common line contact hole, a portion of the second longitudinal common line not overlapping the edge common line is connected to the second connection pattern.

A width of the edge common line is greater than a width of the longitudinal common line.

A width of each longitudinal common line is smaller than a width of each data line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail embodiments of the invention examples of which are illustrated in the accompanying drawings.

Figure 1:
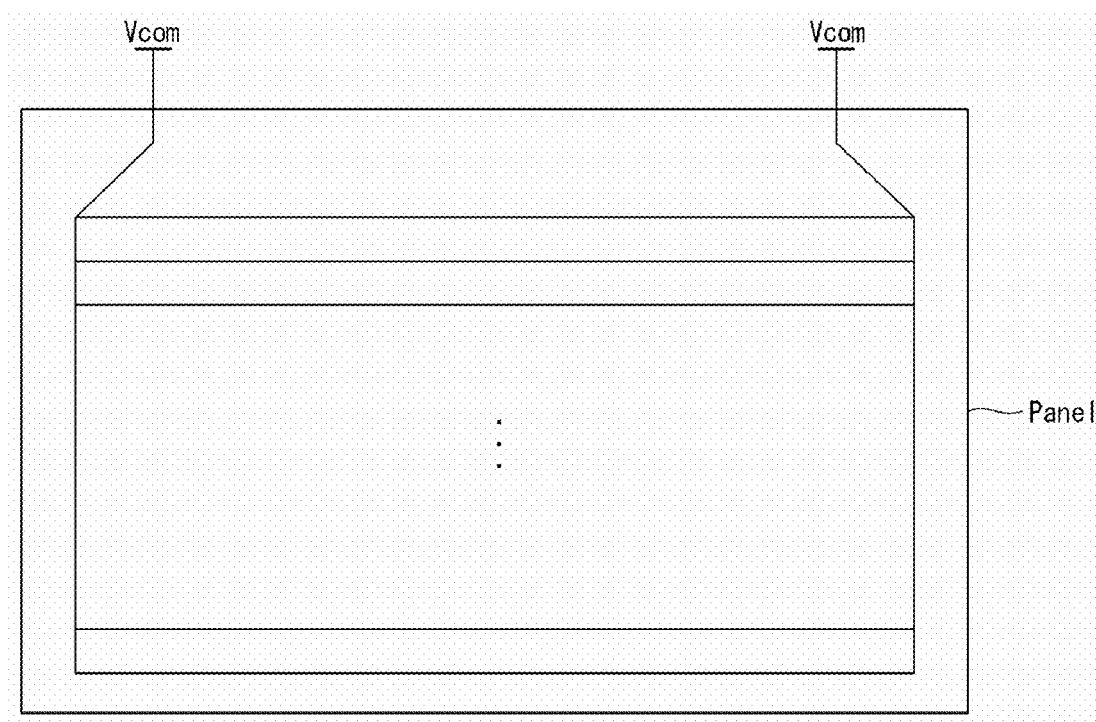
FIG. 1 illustrates a connection structure of a related art common line.
Figure 2A:
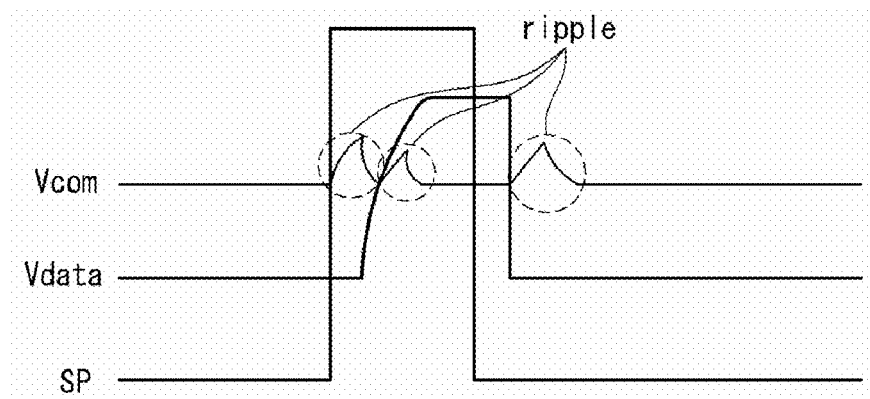
FIG. 2A illustrates a ripple phenomenon resulting from a resistance of a related art common line.
Figure 2B:
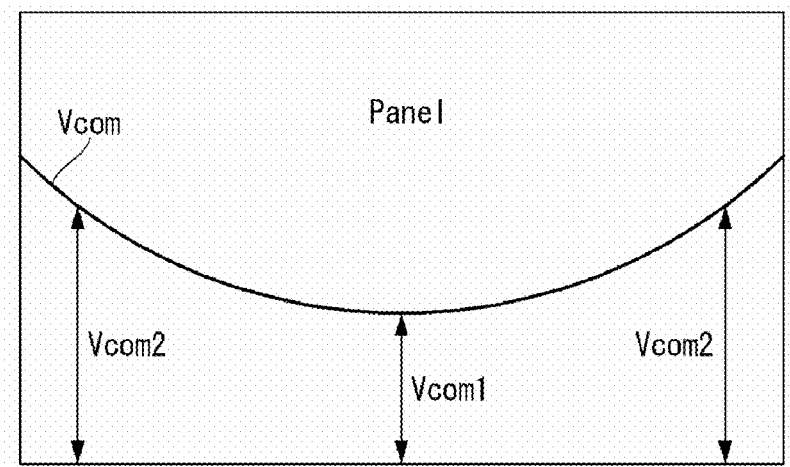
FIG. 2B illustrates a deviation of a common voltage over the entire surface of a related art liquid crystal display panel.
Figure 3A:
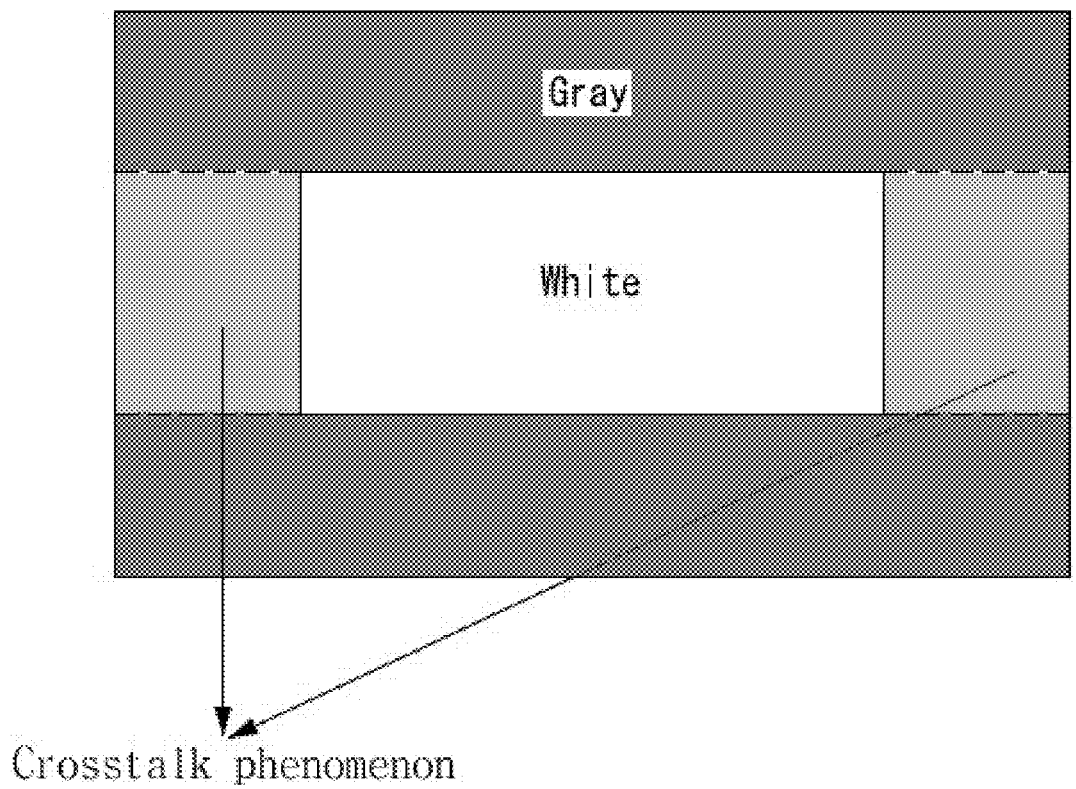
FIG. 3A illustrates a crosstalk phenomenon resulting from an instability of a common voltage in a related art liquid crystal display.
Figure 3B:
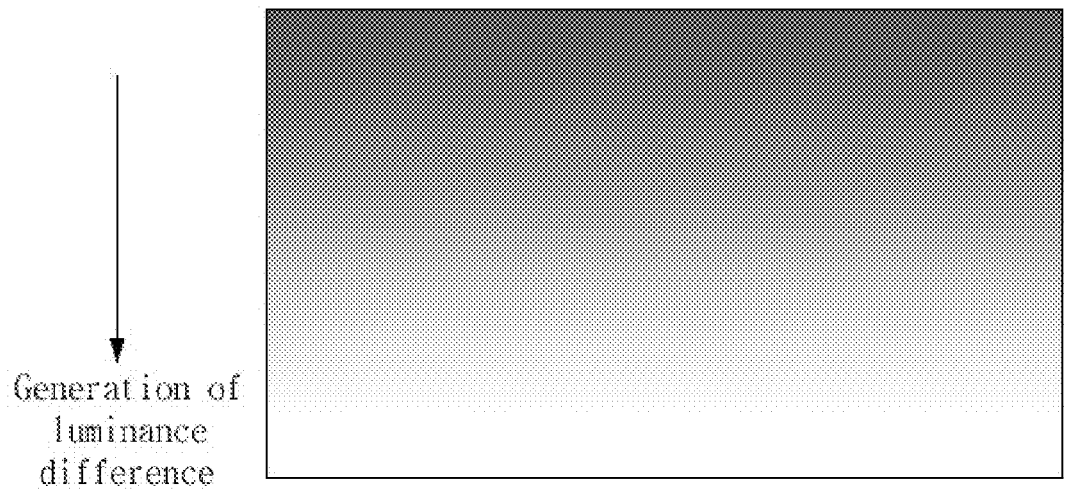
FIG. 3B illustrates a luminance difference resulting from an instability of a common voltage in a related art liquid crystal display.
Figure 4:
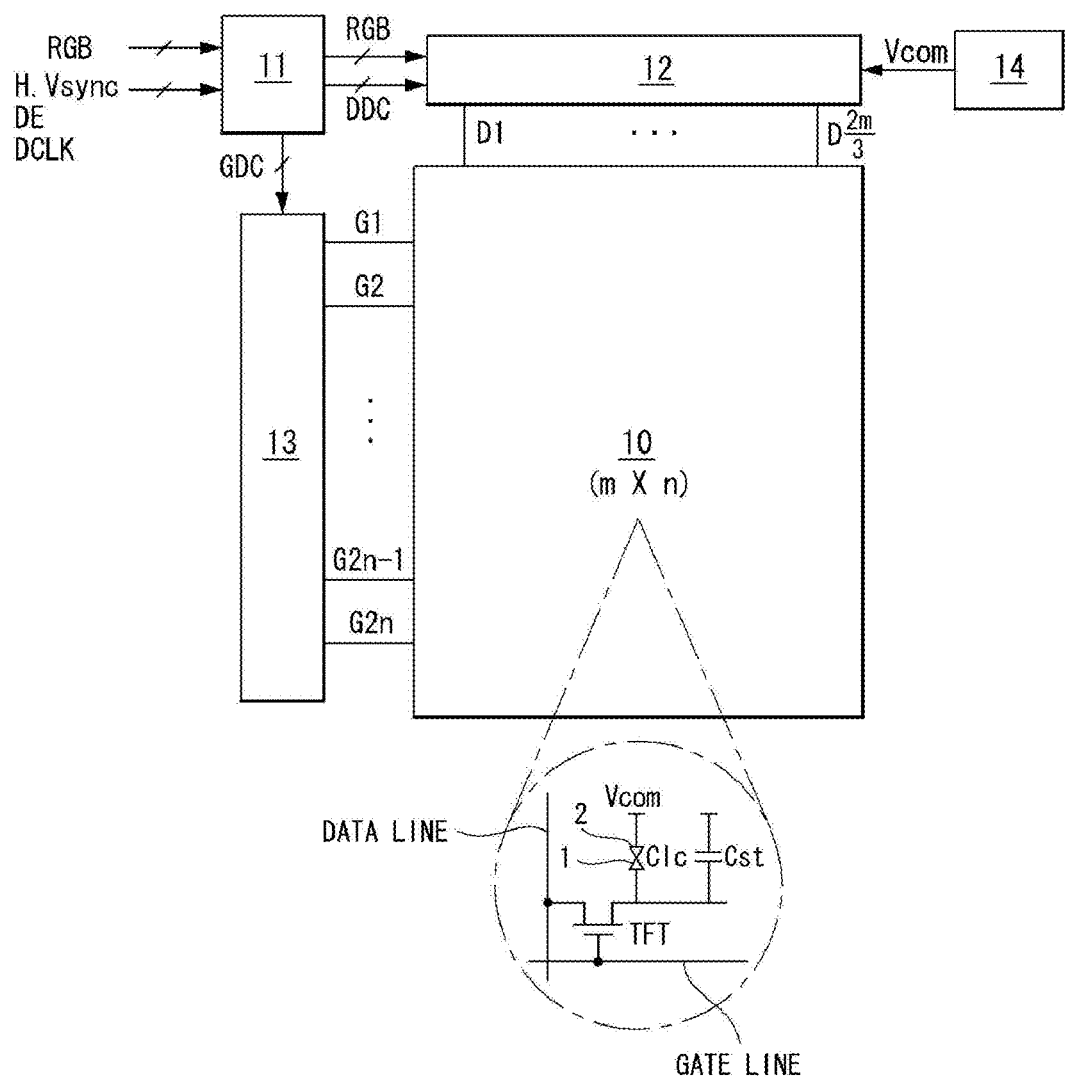
FIG. 4 is a block diagram showing an exemplary configuration of a liquid crystal display according to an embodiment of the invention.

FIG. 4 is a block diagram showing an exemplary configuration of a liquid crystal display according to an embodiment of the invention.

As shown in FIG. 4, a liquid crystal display according to an embodiment of the invention includes a liquid crystal display panel 10, a timing controller 11, a data drive circuit 12, a gate drive circuit 13, and a common voltage generation unit 14.

The liquid crystal display panel 10 includes an upper glass substrate, a lower glass substrate, and a liquid crystal layer between the upper and lower glass substrates. The liquid crystal display panel 10 includes m×n liquid crystal cells Clc (i.e., m×n subpixels) (m and n are positive integer) arranged in a matrix format at each crossing of 2$m$/3 data lines D1 to D(2$m$/3) and 2n gate lines G1 to G2$n$. Two gate lines and two data lines are assigned to each pixel so as to drive pixels each including R, G, and B subpixels that are adjacently positioned in a horizontal direction.

The data lines D1 to D(2$m$/3), the gate lines G1 to G2$n$, thin film transistors (TFTs), the liquid crystal cells Clc that are connected to the TFTs and are driven by an electric field between pixel electrodes 1 and common electrodes 2, a storage capacitor Cst, and the like are formed on the lower glass substrate of the liquid crystal display panel 10. A common line includes an edge common line formed along edges (i.e., a non-display area) of the lower glass substrate, longitudinal common lines that are formed in a direction parallel to the data lines D1 to D(2$m$/3) and are connected to the edge common line, and pixel common line patterns that are formed along edges of each subpixel to have a mesh structure and are connected to the longitudinal common lines. The common line is electrically connected to an output terminal of the common voltage generation unit 14, and the common electrodes 2 are electrically connected to the common line. The common line may form a storage capacitor Cst of a storage-on-common manner in a pixel array. In this case, the common line may overlap the pixel electrodes 1 on the lower glass substrate with an insulating layer interposed between the common line and the pixel electrodes 1.

A black matrix, a color filter, and the common electrodes 2 are formed on the upper glass substrate of the liquid crystal display panel 10.

The common electrode 2 is formed on the upper glass substrate in a vertical electric drive manner, such as a twisted nematic (TN) mode and a vertical alignment (VA) mode. The common electrode 2 and the pixel electrode 1 are formed on the lower glass substrate in a horizontal electric drive manner, such as an in-plane switching (IPS) mode and a fringe field switching (FFS) mode.

Polarizing plates each having optical axes that cross at a right angle are attached respectively to the upper and lower glass substrates. Alignment layers for setting a pre-tilt angle of the liquid crystal in an interface contacting the liquid crystal are respectively formed on the upper and lower glass substrates.

The timing controller 11 receives timing signals, such as horizontal and vertical sync signals Hsync and Vsync, a data enable signal DE, a dot clock signal DCLK to generate a data timing control signal DDC for controlling operation timing of the data drive circuit 12 and a gate timing control signal GDC for controlling operation timing of the gate drive circuit 13. The gate timing control signal GDC includes a gate start pulse GSP, a gate shift clock signal GSC, a gate output enable signal GOE, and the like. The gate start pulse GSP indicates a scan start line of a scan operation. The gate shift clock signal GSC controls an output of the gate drive circuit 13 so that the gate drive circuit 13 sequentially shifts the gate start pulse GSP. The gate output enable signal GOE controls an output of the gate drive circuit 13. The data timing control signal DDC includes a source start pulse SSP, a source sampling clock signal SSC, a source output enable signal SOE, a polarity control signal POL, and the like. The source start pulse SSP indicates a start subpixel in 1 horizontal line to which data will be displayed. The source sampling clock signal SSC indicates a latch operation of data inside the data drive circuit 12 based on a rising or falling edge. The polarity control signal POL controls a polarity of an analog video data voltage output by the data drive circuit 12. The source output enable signal SOE controls an output of a source drive integrated circuit (IC).

The data drive circuit 12 includes a plurality of data drive ICs. Each of the data drive ICs latches digital video data RGB under the control of the timing controller 11, and then converts the digital video data RGB into an analog positive or negative data voltage to supply the analog positive/negative data voltage to the data lines D1 to D2m/3. Each data drive IC supplies a common voltage Vcom generated by the common voltage generation unit 14 to the common line using dummy channels of each data drive IC.

The gate drive circuit 13 includes a plurality of gate drive ICs. The gate drive ICs supply scan pulses to the gate lines G1 to G2n under the control of the timing controller 11.

The common voltage generation unit 14 generates the common voltage Vcom. The common voltage Vcom is applied to the common line via each data drive IC.

Figure 5:
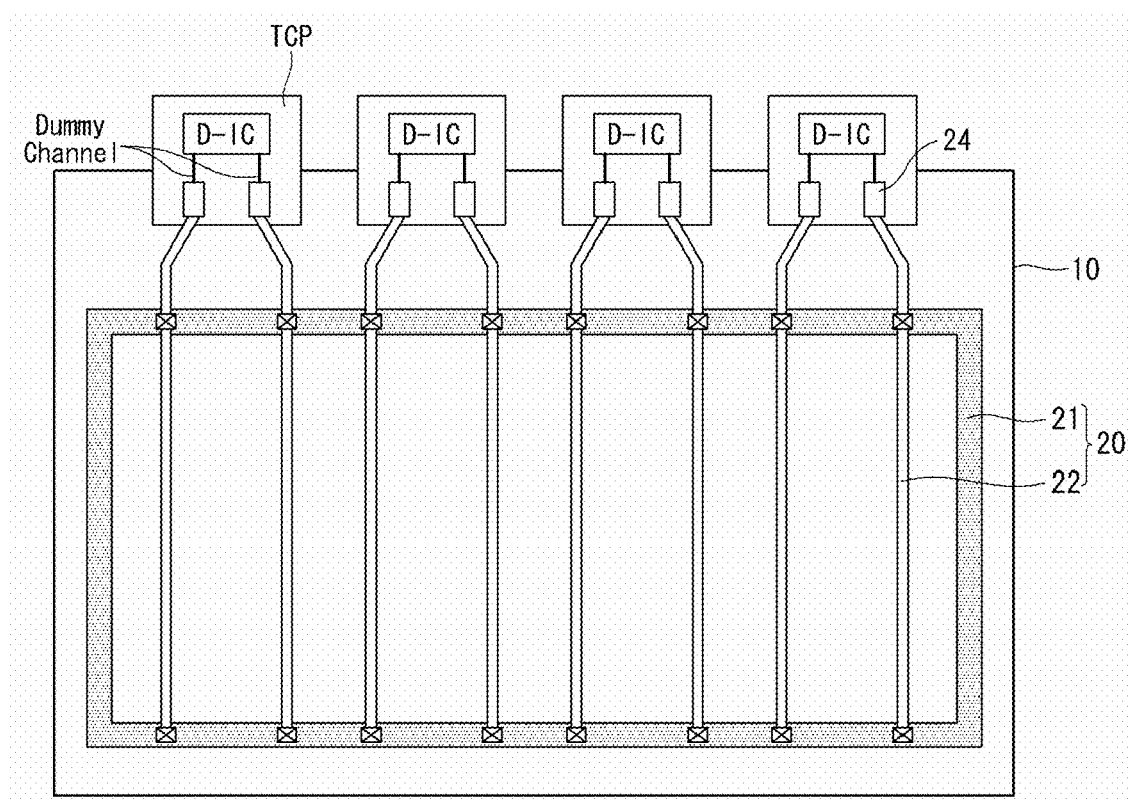
FIG. 5 is a plane view of a common line according to an exemplary embodiment of the invention.
Figure 6:
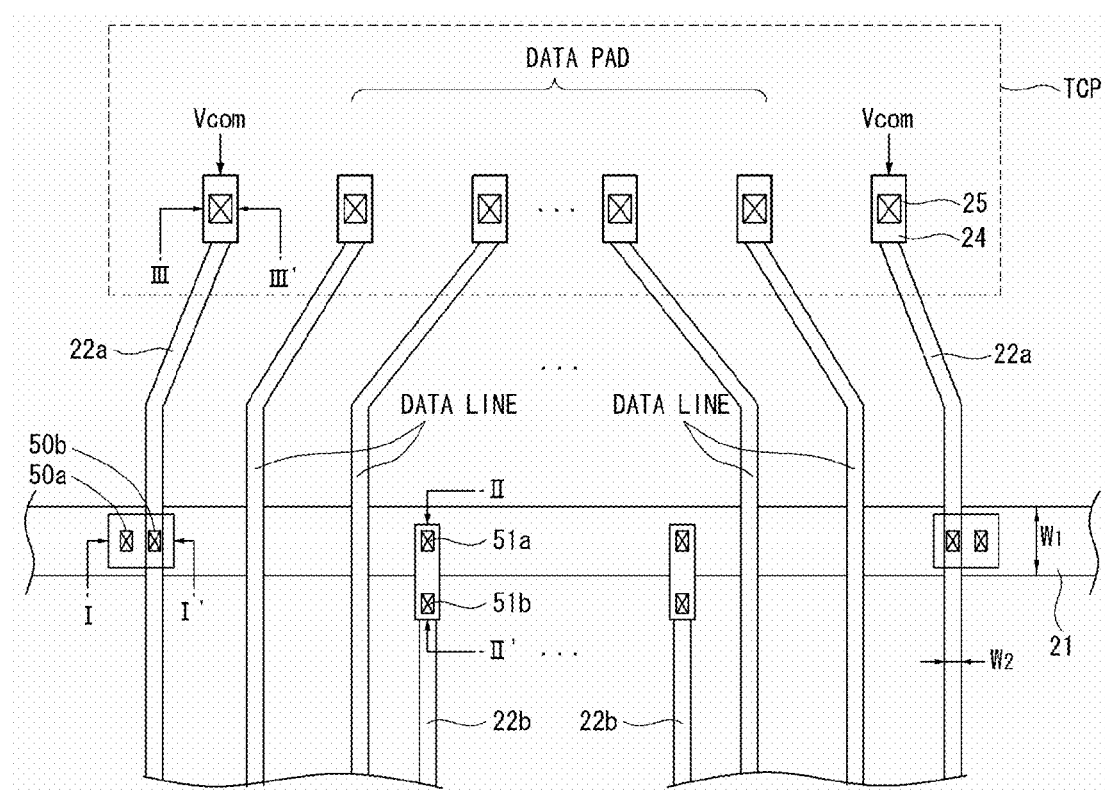
FIG. 6 is a plane view showing a common line and data lines.
Figure 7:
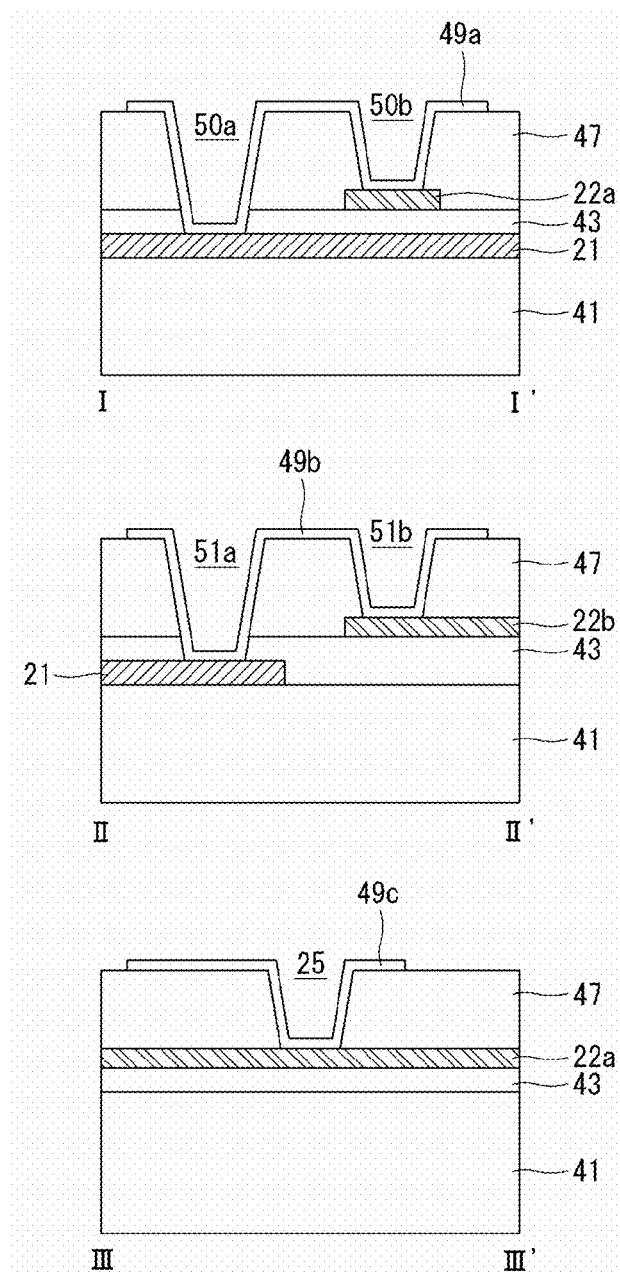
FIG. 7 is a cross-sectional view of a common line taken along lines –', –' and –' shown in FIG. 6.

FIG. 5 is a plane view of the common line according to the embodiment of the invention. FIG. 6 is a plane view showing a portion of the common line and a portion of the data lines. FIG. 7 is a cross-sectional view of a common line taken along lines –', –' and –' shown in FIG. 6. In FIG. 7, a reference numeral 41 denotes a lower glass substrate, 43 a gate insulting layer, and 47 a protective layer.

As shown in FIGS. 5 to 7, a common line 20 includes an edge common line 21 having a relatively wide width at an edge of a substrate, a plurality of longitudinal common lines 22 extending in a longitudinal direction, and a plurality of pixel common line patterns that are formed to have a mesh structure in each subpixel and are connected to one another. The pixel common line patterns will be described later with reference to FIGS. 8 to 12.

The longitudinal common lines 22 include a plurality of first longitudinal common lines 22a and a plurality of second longitudinal common lines 22b. The longitudinal common lines 22a and 22b are formed in a direction parallel to the data lines. The longitudinal common lines 22a and 22b are formed alternately between pixels, including R, G, and B subpixels, horizontally adjacent to each other, so as to increase an aperture ratio in a pixel array.

Each of the first longitudinal common lines 22a is connected to a Vcom pad 24. Each of the first longitudinal common lines 22a is electrically connected to the edge common line 21 through first and second common line contact holes 50a and 50b. In the first common line contact hole 50a, a portion of the edge common line 21 not overlapping the first longitudinal common line 22a is connected to a first connection pattern 49a. In the second common line contact hole 50b, a portion of the first longitudinal common line 22a overlapping the edge common line 21 is connected to the first connection pattern 49a. The first connection pattern 49a may be formed of a transparent electrode material.

Each of the second longitudinal common lines 22b is electrically connected to the edge common line 21 through third and fourth common line contact holes 51a and 51b. In the third common line contact hole 51a, a portion of the edge common line 21 not overlapping the second longitudinal common line 22b is connected to a second connection pattern 49b. In the fourth common line contact hole 51b, a portion of the second longitudinal common line 22b not overlapping the edge common line 21 is connected to the second connection pattern 49b. The second connection pattern 49b may be formed of a transparent electrode material.

The Vcom pad 24 is connected to the first longitudinal common line 22a through a Vcom contact hole 25. In the Vcom contact hole 25, the first longitudinal common line 22a is connected to a third connection pattern 49c. The third connection pattern 49c may be formed of a transparent electrode material.

The two Vcom pads 24 are assigned to each data drive IC D-IC so that the Vcom pads 24 are respectively connected to two dummy channels disposed at each data drive IC D-IC. The Vcom pad 24 transfers the common voltage Vcom supplied via the data drive IC D-IC to the common line 20. The Vcom pad 24 may be connected to an output terminal of the common voltage generation unit 14 to transfer the common voltage Vcom from the common voltage generation unit 14 to the common line 20 without passing through the data drive IC D-IC. Because the number of Vcom pads 24 in the exemplary embodiment greatly increases as compared with two input units for supplying the common voltage in the related art, a deviation of the common voltage over the entire surface of the liquid crystal display panel 10 can be greatly reduced. Further, a resistance of the common line 20 can be greatly reduced.

A width W1 of the edge common line 21 is greater than a width W2 of the longitudinal common line 22 so as to reduce the resistance of the common line 20. It is preferable that the width W2 of each longitudinal common line 22 is smaller than a width of each data line so as to prevent a reduction in an aperture ratio in the pixel array.

As described above, because the liquid crystal display according to the embodiment of the invention includes the common line 20 including the edge common line 21 of the relatively wide width and the longitudinal common lines 22 that are connected to the edge common line 21 and extend in a direction parallel to the data lines, a load of the common line 20 can be distributed, and a distortion of the common line 20 can be reduced. For example, in the related art, because common lines are formed in a direction parallel to gate lines, when 1 horizontal line is scanned by a scan pulse, one common line is affected by a data voltage applied to all of subpixels on the 1 horizontal line. However, in the embodiment of the invention, when 1 horizontal line is scanned by a scan pulse, only a data voltage applied to 3 subpixels affects the longitudinal common lines 22. Therefore, the load of the common line 20 is greatly distributed.

Further, in the liquid crystal display according to the embodiment of the invention, because the number of input units used to apply the common voltage Vcom to the common line 20 increases, a deviation of the common voltage Vcom over the entire surface of the liquid crystal display panel 10 can be greatly reduced. Further, a resistance of the common line 20 can be greatly reduced.

Each longitudinal common line 22 is formed between not the liquid crystal cells but the pixels, and the common voltage Vcom applied to the longitudinal common lines 22 is applied to the pixel common line patterns having the mesh structure in each subpixel in consideration of a reduction in the aperture ratio.

Figure 8:
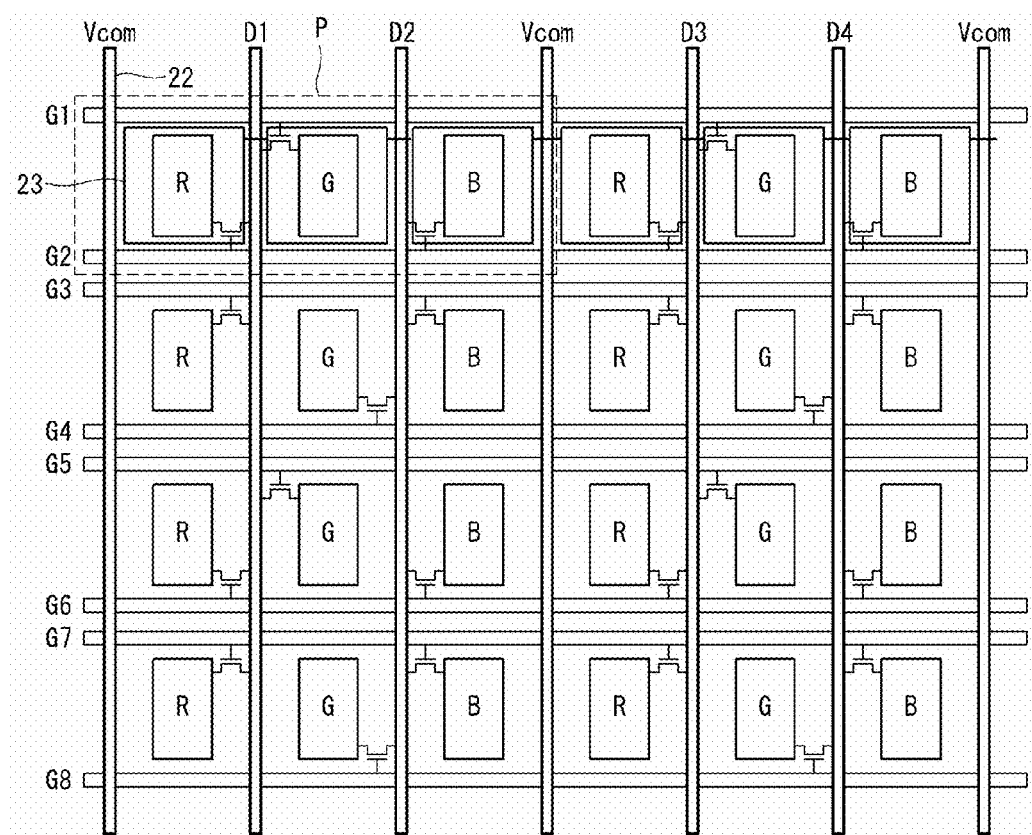
FIG. 8 schematically shows a liquid crystal display panel on which longitudinal common lines and pixel common line patterns are formed.

FIG. 8 schematically shows the liquid crystal display panel 10 on which the longitudinal common lines 22 and pixel common line patterns 23 are formed.

As shown in FIG. 8, the liquid crystal display according to the embodiment of the invention drives each pixel P including R, G, and B subpixels using two data lines and two gate lines, so as to reduce the number of data drive ICs by reducing the number of data lines.

More specifically, each of pixels P of odd-numbered horizontal lines uses a first data line of two data lines assigned to each pixel P as a common data line, and each of pixels P of even-numbered horizontal lines uses a second data line of two data lines assigned to each pixel P as a common data line. For example, R and G subpixels of a first pixel on a first horizontal line share a first data line D1, and G and B subpixels of a second pixel vertically adjacent to the first pixel on a second horizontal line share a second data line D2. TFTs respectively connected to R, G, and B subpixels of any pixel are connected between two gate lines in zigzags. Accordingly, in the first pixel on the first horizontal line, the G subpixel is charged to a first data voltage from the first data line D1 in response to a scan pulse from a first gate line G1, the R subpixel is charged to a second data voltage from the first data line D1 in response to a scan pulse from a second gate line G2, and the B subpixel is charged to a third data voltage from the second data line D2 in response to a scan pulse from the second gate line G2. Further, in the second pixel vertically adjacent to the first pixel on the second horizontal line, the R subpixel is charged to a fourth data voltage from the first data line D1 in response to a scan pulse from a third gate line G3, the B subpixel is charged to a fifth data voltage from the second data line D2 in response to a scan pulse from the third gate line G3, and the G subpixel is charged to a sixth data voltage from the second data line D2 in response to a scan pulse from a fourth gate line G4.

Each of the longitudinal common lines 22 has the same metal pattern as the date line and is positioned every two data lines. The pixel common line pattern 23 has the same metal pattern as the gate line and is formed along edges of each subpixel. Hence, the pixel common line pattern 23 has a mesh structure in each subpixel. The pixel common line pattern 23 supplies the common voltage Vcom from the longitudinal common line 22 to the common electrode of each subpixel. For this, the pixel common line pattern 23 is connected to the common electrode and the longitudinal common lines 22 through a contact hole.

Figure 9:
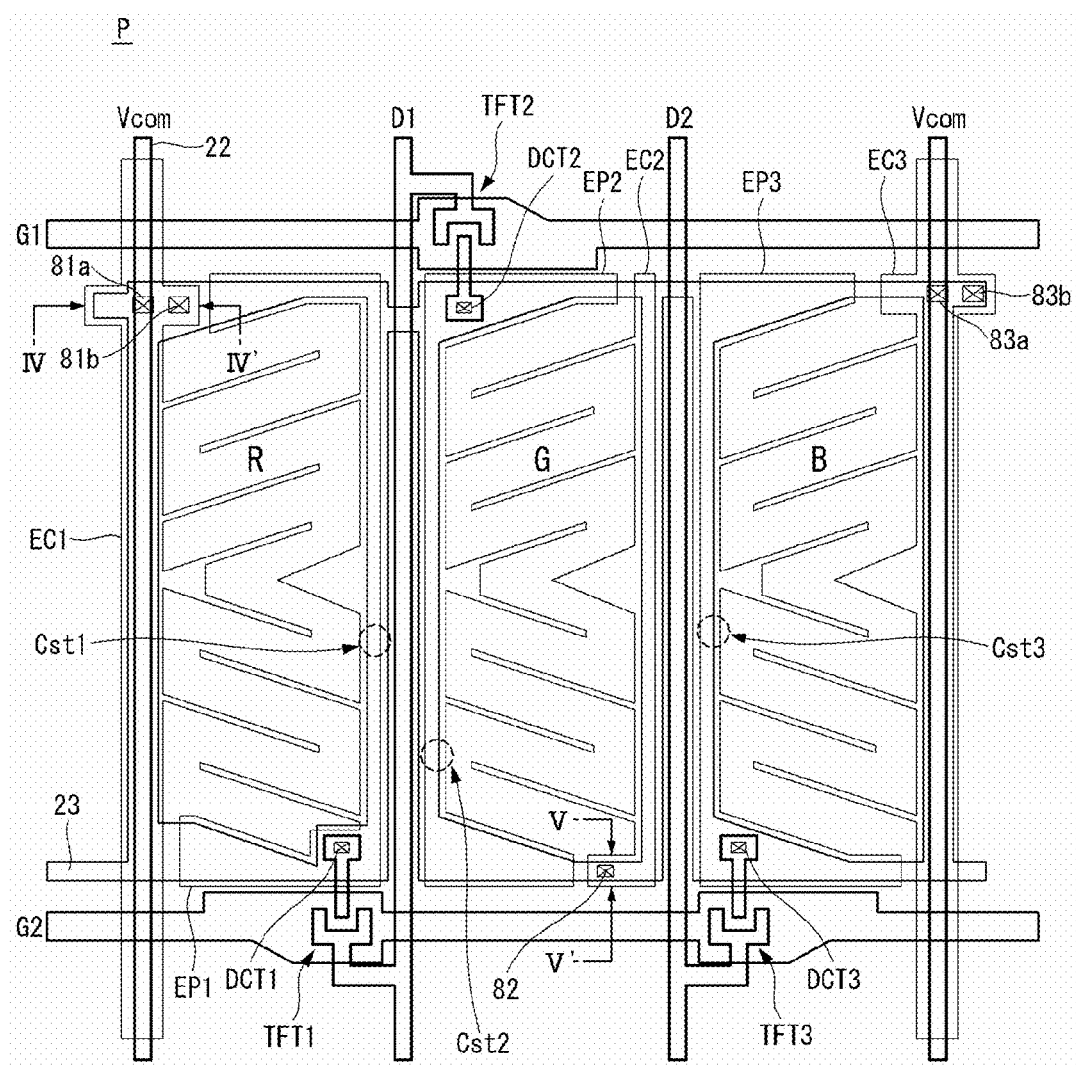
FIG. 9 illustrates an exemplary operation of a pixel shown in FIG. 8 in a horizontal in-plane switching (IPS) mode.
Figure 10:
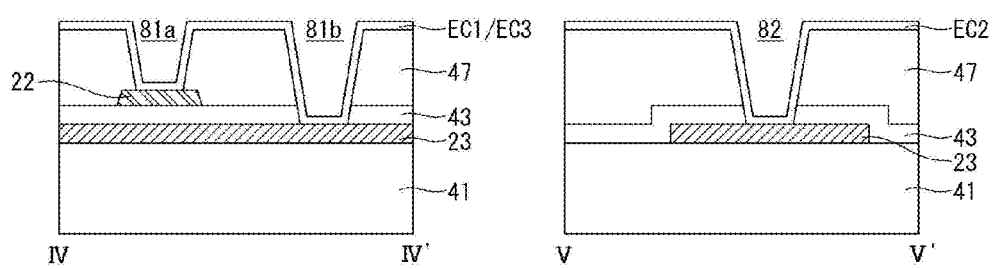
FIG. 10 illustrates a connection structure among a longitudinal common line, a pixel common line pattern, and a common electrode in each subpixel taken along lines IV-IV' and V-V' of FIG. 9.

FIG. 9 illustrates an exemplary operation of the pixel P shown in FIG. 8 in a horizontal in-plane switching (IPS) mode. FIG. 10 illustrates a connection structure among the longitudinal common line 22, the pixel common line pattern 23, and the common electrode in each subpixel taken along lines IV-IV' and V-V' of FIG. 9. In FIG. 10, a reference numeral 41 denotes a lower glass substrate, 43 a gate insulating layer, and 47 a protective layer.

As shown in FIGS. 9 and 10, each subpixel includes the pixel common line pattern 23 having the mesh structure and is driven by a voltage difference between the common electrode and the pixel electrode that are opposite to each other in a horizontal direction.

More specifically, in an R subpixel, a common electrode Ec1 of the R subpixel includes a plurality of first fingers inclining to the data lines and a first connection portion that overlaps the longitudinal common line 22 and the pixel common line pattern 23 and is formed parallel to the data lines to connect the first fingers to each other. A pixel electrode Ep1 of the R subpixel includes a plurality of second fingers, that incline to the data lines and are opposite to the first fingers on the same plane as the first fingers, and a second connection portion that partially overlaps the pixel common line pattern 23 to connect the second fingers to each other. The common electrode Ec1 is connected to the longitudinal common line 22 through a first common electrode contact hole 81a and is connected to the pixel common line pattern 23 through a second common electrode contact hole 81b. The pixel electrode Ep1 is connected to a first TFT TFT1 through a first drain contact hole DCT1. The first TFT TFT1 supplies the second data voltage from the first data line D1 to the pixel electrode Ep1 in response to a scan pulse from the second gate line G2. A first storage capacitor Cst1 is formed in an overlap area of the second connection portion and the pixel common line pattern 23 to keep a voltage during one frame at the second data voltage.

In a G subpixel, a common electrode Ec2 of the G subpixel includes a plurality of third fingers inclining to the data lines and a third connection portion that overlaps the pixel common line pattern 23 and is formed parallel to the data lines to connect the third fingers to each other. A pixel electrode Ep2 of the G subpixel includes a plurality of fourth fingers, that incline to the data lines and are opposite to the third fingers on the same plane as the third fingers, and a fourth connection portion that partially overlaps the pixel common line pattern 23 to connect the fourth fingers to each other. The common electrode Ec2 is connected to the pixel common line pattern 23 through a third common electrode contact hole 82. The pixel electrode Ep2 is connected to a second TFT TFT2 through a second drain contact hole DCT2. The second TFT TFT2 supplies the first data voltage from the first data line D1 to the pixel electrode Ep2 in response to a scan pulse from the first gate line G1. A second storage capacitor Cst2 is formed in an overlap area of the fourth connection portion and the pixel common line pattern 23 to keep a voltage during one frame at the first data voltage.

In a B subpixel, a common electrode Ec3 of the B subpixel includes a plurality of fifth fingers inclining to the data lines and a fifth connection portion that overlaps the longitudinal common line 22 and the pixel common line pattern 23 and is formed parallel to the data lines to connect the fifth fingers to each other. A pixel electrode Ep3 of the B subpixel includes a plurality of sixth fingers, that incline to the data lines and are opposite to the fifth fingers on the same plane as the fifth fingers, and a sixth connection portion that partially overlaps the pixel common line pattern 23 to connect the sixth fingers to each other. The common electrode Ec3 is connected to the longitudinal common line 22 through a fourth common electrode contact hole 83a and is connected to the pixel common line pattern 23 through a fifth common electrode contact hole 83b. The fourth common electrode contact hole 83a and the fifth common electrode contact hole 83b have substantially the same configuration as the first common electrode contact hole 81a and the second common electrode contact hole 81b, respectively. The pixel electrode Ep3 is connected to a third TFT TFT3 through a third drain contact hole DCT3. The third TFT TFT3 supplies the third data voltage from the second data line D2 to the pixel electrode Ep3 in response to a scan pulse from the second gate line G2. A third storage capacitor Cst3 is formed in an overlap area of the sixth connection portion and the pixel common line pattern 23 to keep a voltage during one frame at the third data voltage.

Figure 11:
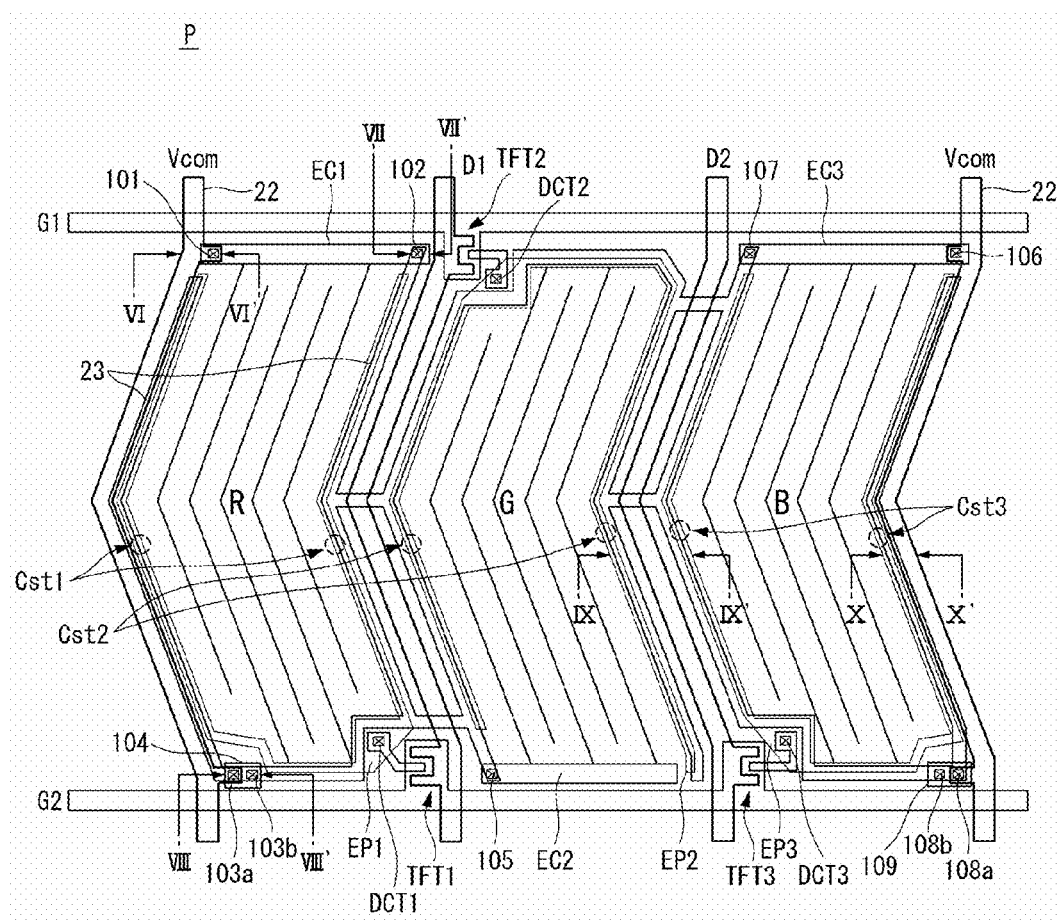
FIG. 11 illustrates an exemplary operation of a pixel shown in FIG. 8 in a super IPS mode.
Figure 12:
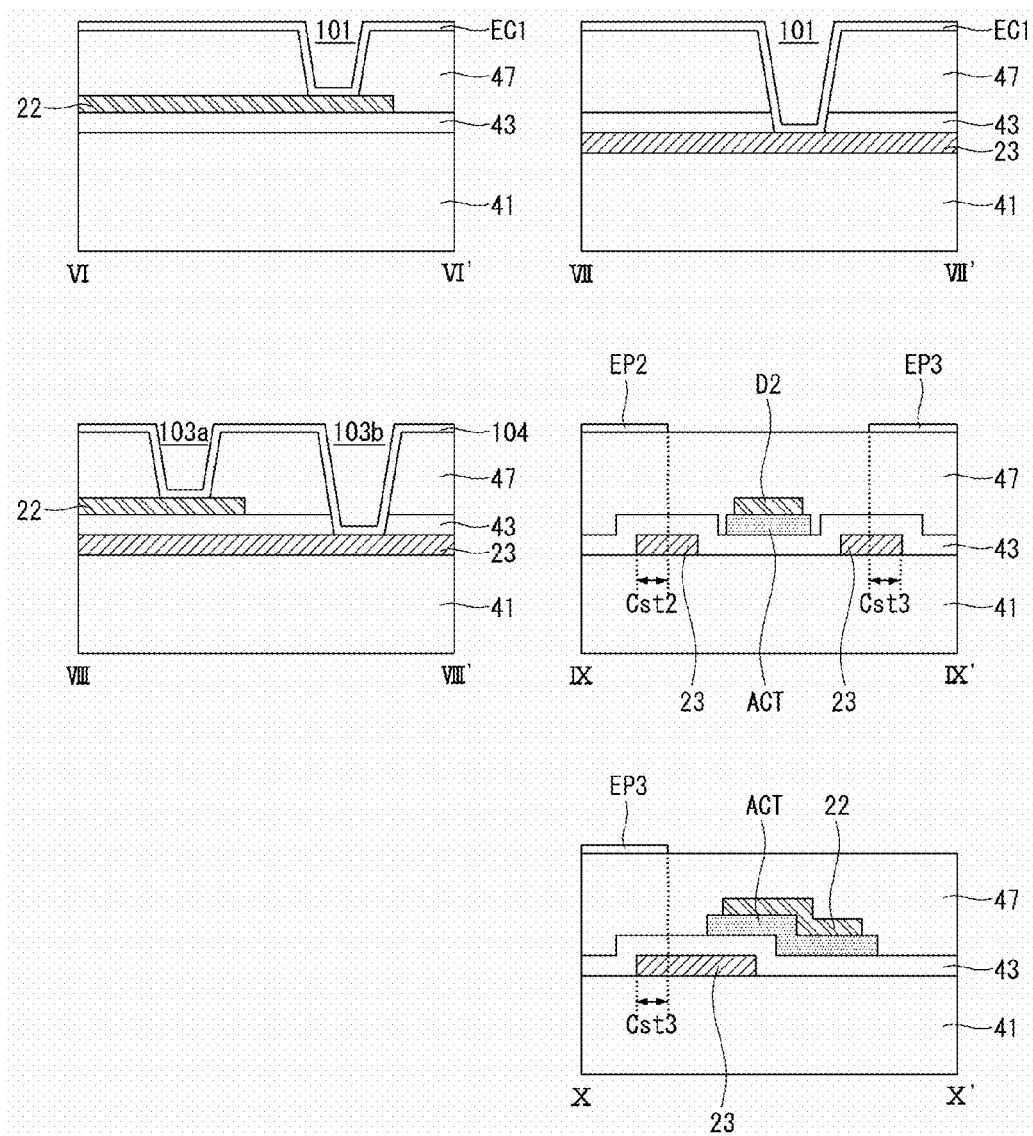
FIG. 12 illustrates a connection structure among a longitudinal common line, a pixel common line pattern, and a common electrode in each subpixel taken along lines –', –', –', –', and –' of FIG. 11.

FIG. 11 illustrates an exemplary operation of the pixel P shown in FIG. 8 in a super IPS mode. FIG. 12 illustrates a connection structure among the longitudinal common line 22, the pixel common line pattern 23, and the common electrode in each subpixel taken along lines VI-VI', −', −', −', and −' of FIG. 11. In FIG. 12, a reference numeral 41 denotes a lower glass substrate, 43 a gate insulating layer, 47 a protective layer, and ACT a semiconductor layer.

As shown in FIGS. 11 and 12, each subpixel includes the pixel common line pattern 23 having the mesh structure and is driven by a voltage difference between the common electrode and the pixel electrode that are opposite to each other in a horizontal direction.

More specifically, in an R subpixel, a common electrode Ec1 of the R subpixel includes a plurality of first fingers parallel to the data lines and a first connection portion that partially overlaps the longitudinal common line 22 and the pixel common line pattern 23 and is formed parallel to the gate lines to connect the first fingers to each other. A pixel electrode Ep1 of the R subpixel includes a plurality of second fingers, that are formed parallel to the data lines and are opposite to the first fingers on the same plane as the first fingers, and a second connection portion that partially overlaps the pixel common line pattern 23 to connect the second fingers to each other. The common electrode Ec1 is connected to the longitudinal common line 22 through a first common electrode contact hole 101 and is connected to the pixel common line pattern 23 through a second common electrode contact hole 102. The pixel common line pattern 23 is again connected to the longitudinal common line 22 through first and second common line contact holes 103a and 103b and a first transparent electrode pattern 104 so as to more stably receive a common voltage Vcom. The pixel electrode Ep1 is connected to a first TFT TFT1 through a first drain contact hole DCT1. The first TFT TFT1 supplies the second data voltage from the first data line D1 to the pixel electrode Ep1 in response to a scan pulse from the second gate line G2. A first storage capacitor Cst1 is formed in an overlap area of the second connection portion and the pixel common line pattern 23 to keep a voltage during one frame at the second data voltage.

In a G subpixel, a common electrode Ec2 of the G subpixel includes a plurality of third fingers parallel to the data lines and a third connection portion that partially overlaps the pixel common line pattern 23 and is formed parallel to the gate lines to connect the third fingers to each other. A pixel electrode Ep2 of the G subpixel includes a plurality of fourth fingers, that are formed parallel to the data lines and are opposite to the third fingers on the same plane as the third fingers, and a fourth connection portion that partially overlaps the pixel common line pattern 23 to connect the fourth fingers to each other. The common electrode Ec2 is connected to the pixel common line pattern 23 through a third common electrode contact hole 105. The pixel electrode Ep2 is connected to a second TFT TFT2 through a second drain contact hole DCT2. The second TFT TFT2 supplies the first data voltage from the first data line D1 to the pixel electrode Ep2 in response to a scan pulse from the first gate line G1. A second storage capacitor Cst2 is formed in an overlap area of the fourth connection portion and the pixel common line pattern 23 to keep a voltage during one frame at the first voltage.

In a B subpixel, a common electrode Ec3 of the B subpixel includes a plurality of fifth fingers parallel to the data lines and a fifth connection portion that partially overlaps the longitudinal common line 22 and the pixel common line pattern 23 and is formed parallel to the gate lines to connect the fifth fingers to each other. A pixel electrode Ep3 of the B subpixel includes a plurality of sixth fingers, that are formed parallel to the data lines and are opposite to the fifth fingers on the same plane as the fifth fingers, and a sixth connection portion that partially overlaps the pixel common line pattern 23 to connect the sixth fingers to each other. The common electrode Ec3 is connected to the longitudinal common line 22 through a fourth common electrode contact hole 106 and is connected to the pixel common line pattern 23 through a fifth common electrode contact hole 107. The fourth common electrode contact hole 106 and the fifth common electrode contact hole 107 have substantially the same configuration as the first common electrode contact hole 101 and the second common electrode contact hole 102, respectively. The pixel common line pattern 23 is again connected to the longitudinal common line 22 through third and fourth common line contact hole 108a and 108b and a second transparent electrode pattern 109 so as to more stably receive a common voltage Vcom. The third and fourth common line contact holes 108a and 108b have substantially the same configuration as the first and second common line contact holes 103a and 103b, respectively. The second transparent electrode pattern 109 has substantially the same configuration as the first transparent electrode pattern 104. The pixel electrode Ep3 is connected to a third TFT TFT3 through a third drain contact hole DCT3. The third TFT TFT3 supplies the third data voltage from the second data line D2 to the pixel electrode Ep3 in response to a scan pulse from the second gate line G2. A third storage capacitor Cst3 is formed in an overlap area of the sixth connection portion and the pixel common line pattern 23 to keep a voltage during one frame at the third data voltage.

A formation area of the storage capacitor in the liquid crystal display panel including the pixel shown in FIGS. 11 and 12 is wider than a formation area of the storage capacitor in the liquid crystal display panel including the pixel shown in FIGS. 9 and 10. Accordingly, if the liquid crystal display panel including the pixel shown in FIGS. 9 and 10 is applied to a small-sized liquid crystal display such as a monitor, the liquid crystal display panel including the pixel shown in FIGS. 11 and 12 may be applied to a large-sized liquid crystal display such as TV.

Figure 13:
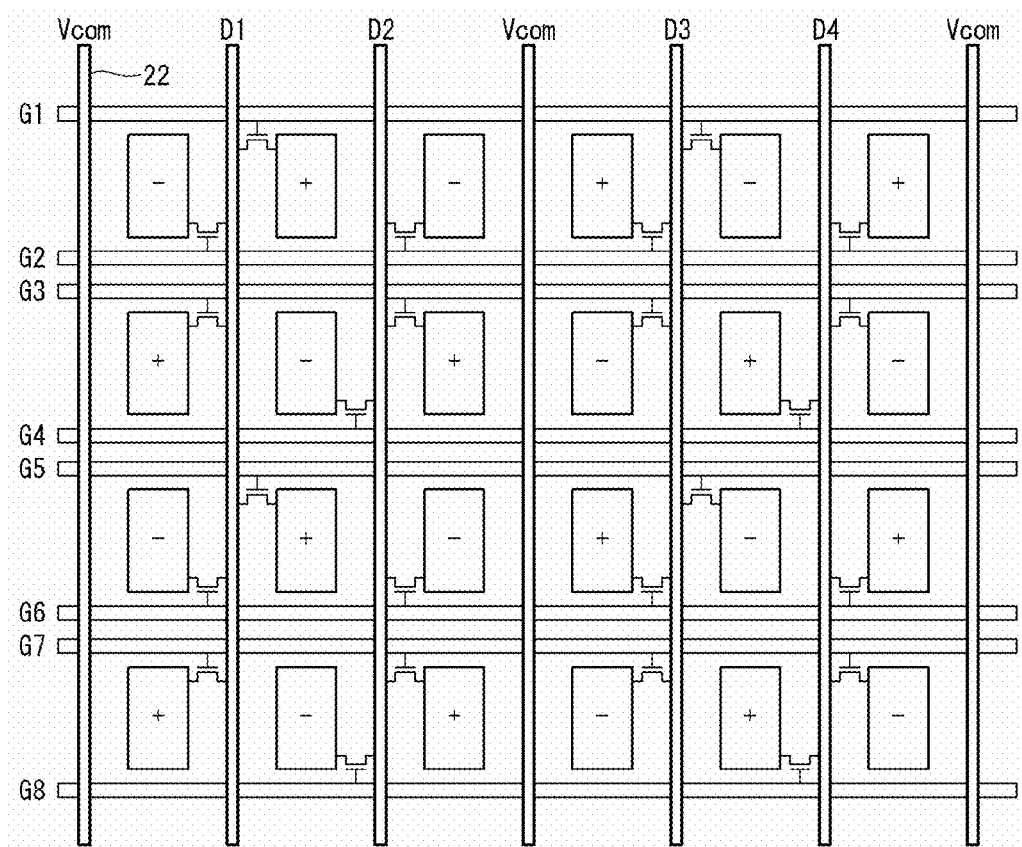
FIG. 13 illustrates an exemplary drive of the liquid crystal display panel shown in FIG. 8.
Figure 14:
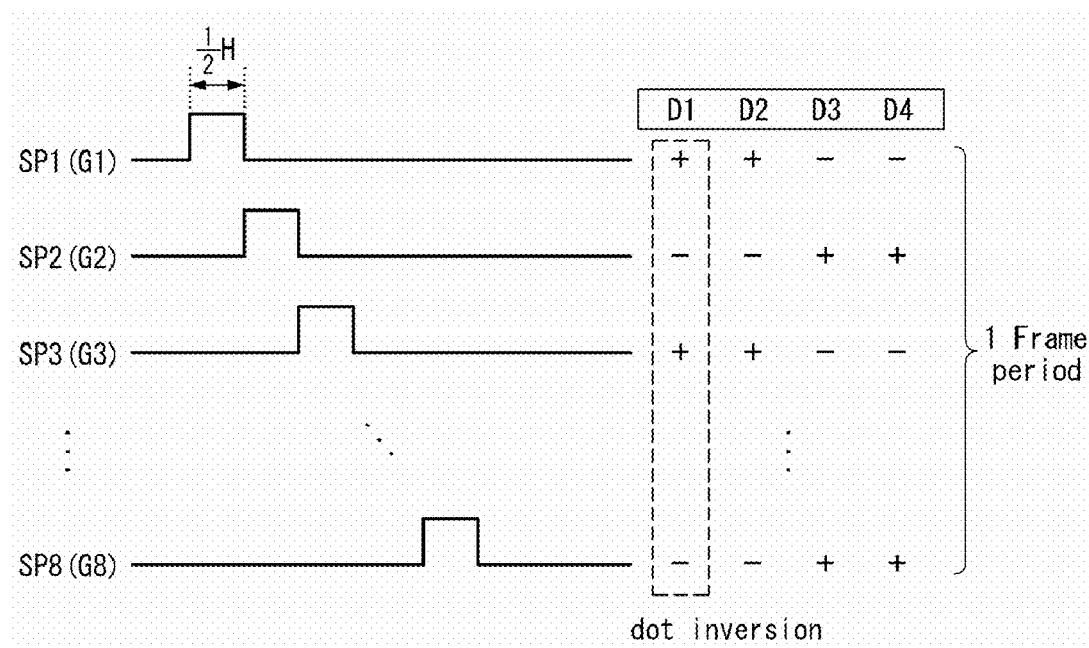
FIG. 14 illustrates a driving timing of scan pulses required in the drive of FIG. 13 and changes in polarities of voltages supplied to data lines synchronized with the scan pulses.

FIG. 13 illustrates an exemplary drive of the liquid crystal display panel 10 shown in FIG. 8. FIG. 14 illustrates a driving timing of scan pulses required in the drive of FIG. 13 and changes in polarities of voltages supplied to data lines synchronized with the scan pulses.

As shown in FIGS. 13 and 14, scan pulses SP1 to SP8 each having a width of about ½ horizontal period (½)H are sequentially generated and are supplied to first to eighth gate lines G1 to G8. The data drive IC inverts polarities of data voltages, that are synchronized with the generation of the scan pulses SP1 to SP8 and are supplied to first to fourth data lines D1 to D4 every about ½ horizontal period (½)H, in a dot inversion scheme. Supposing that the data voltages simultaneously generated by the data drive IC have a first polarity pattern (++−−), polarities of the data voltages supplied to the first to fourth data lines D1 to D4 have the first polarity pattern during a generation period of the odd-numbered scan pulses SP1, SP3, SP5, and SP7 and have a second polarity pattern (−−++) opposite the first polarity pattern during a generation period of the even-numbered scan pulses SP2, SP4, SP6, and SP8. Accordingly, polarities of the data voltage displayed on the liquid crystal display panel 10 are inverted between horizontally and vertically adjacent subpixels through the TFTs connected in zigzags.

Figure 15:
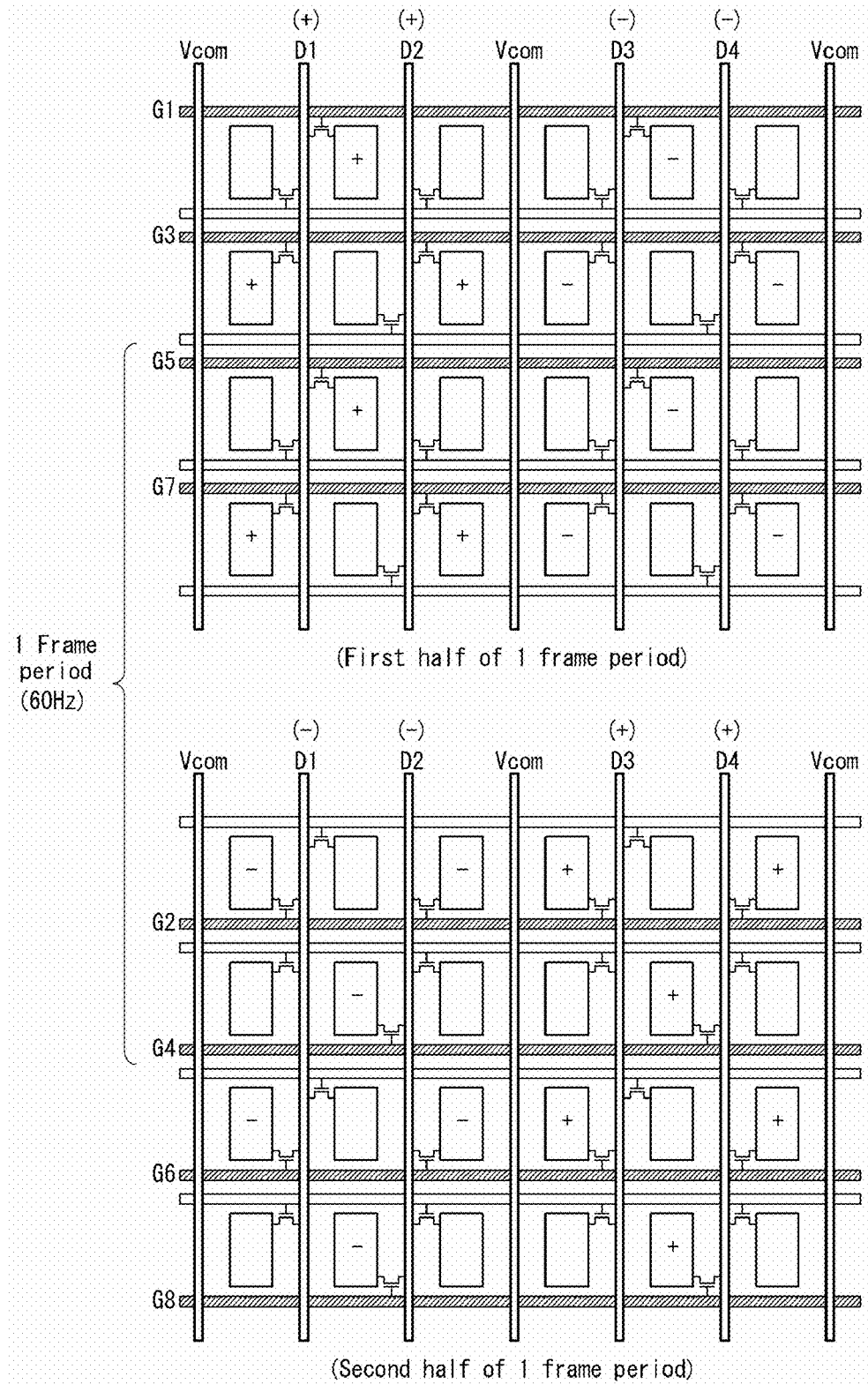
FIG. 15 illustrates another exemplary drive of the liquid crystal display panel shown in FIG. 8.
Figure 16:
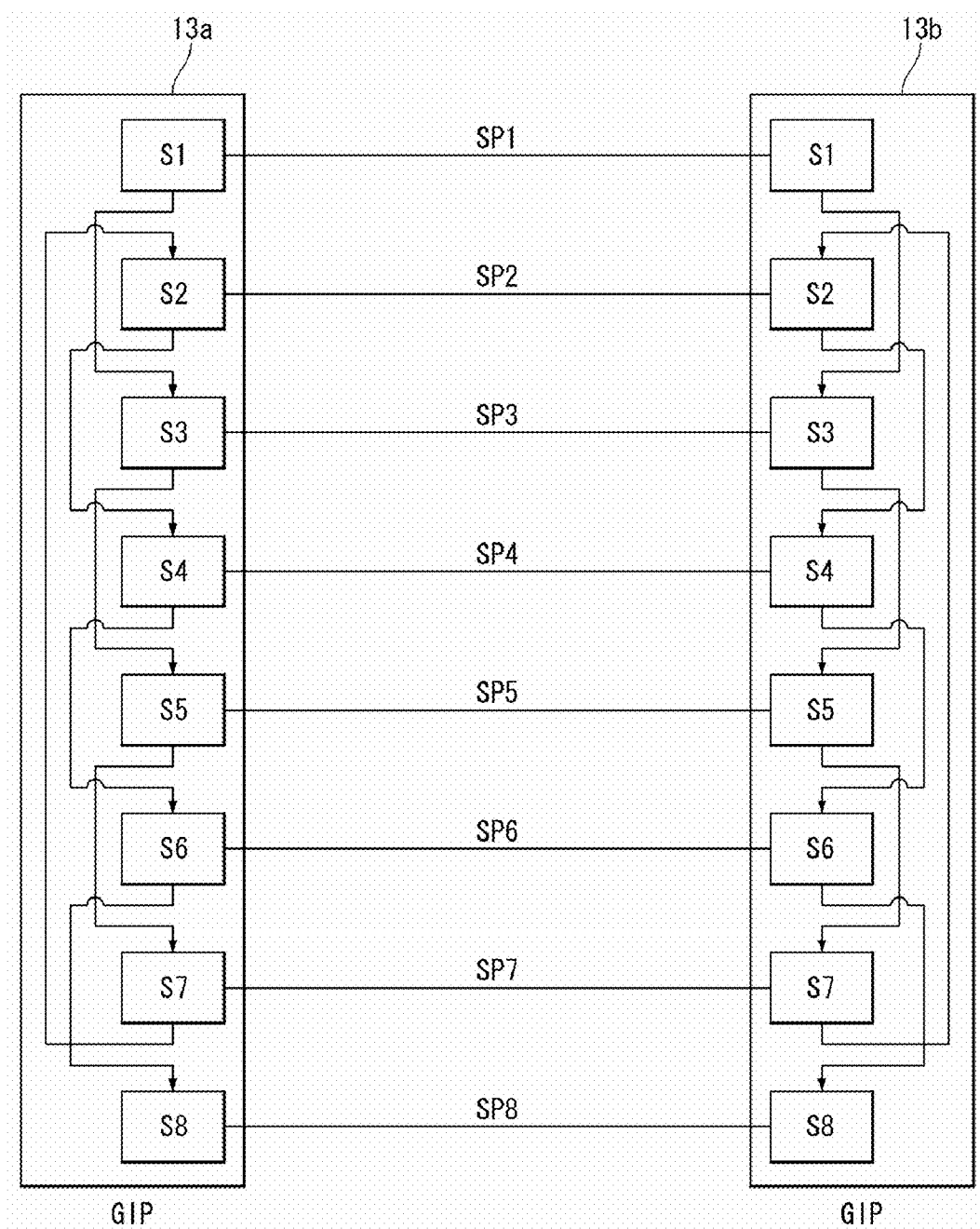
FIG. 16 illustrates an exemplary configuration of a gate drive circuit.
Figure 17:
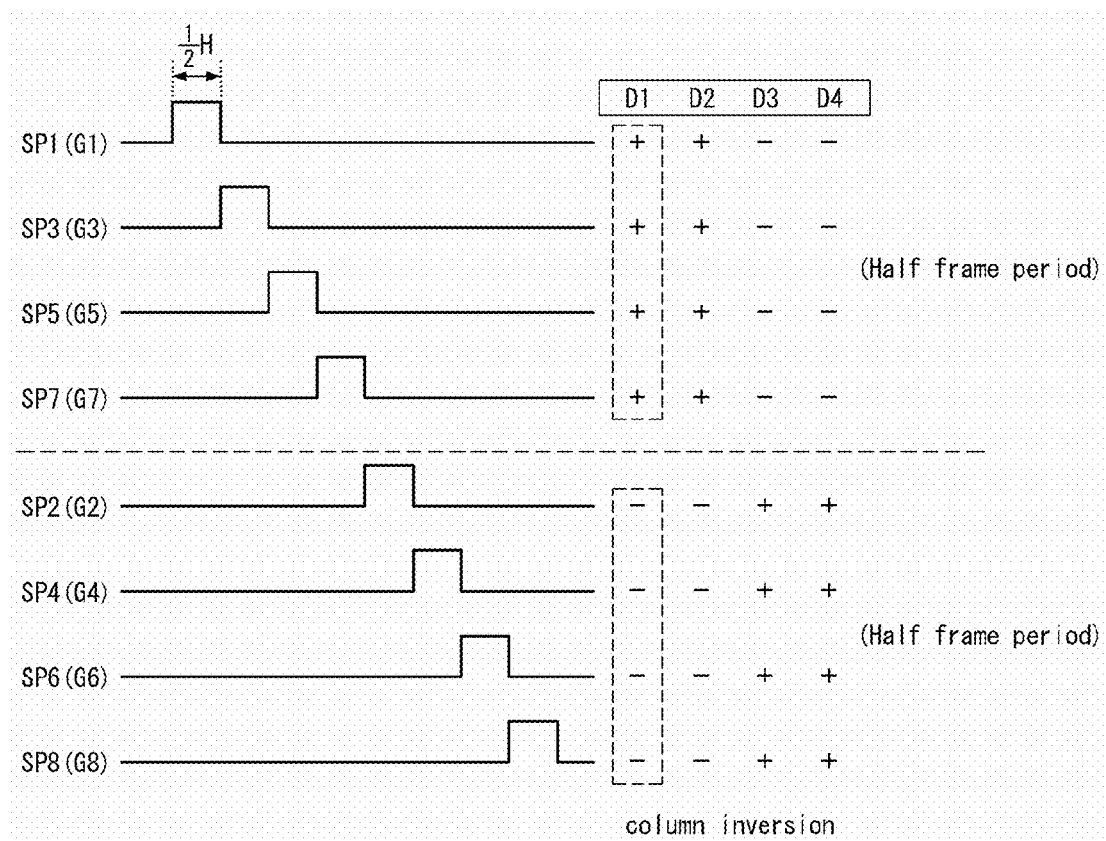
FIG. 17 illustrates a driving timing of scan pulses required in the drive of FIG. 15 and changes in polarities of voltages supplied to data lines synchronized with the scan pulses.

FIG. 15 illustrates another exemplary drive of the liquid crystal display panel 10 shown in FIG. 8. FIG. 16 illustrates an exemplary configuration of the gate drive circuit 13. FIG. 17 illustrates a driving timing of scan pulses required in the drive of FIG. 15 and changes in polarities of voltages supplied to data lines synchronized with the scan pulses.

As shown in FIGS. 15 to 17, scan pulses SP1, SP3, SP5, and SP7 each having a width of about ½ horizontal period (½)H are sequentially generated and are supplied to odd-numbered gate lines G1, G3, G5, and G7 during a first half frame period. Subsequently, scan pulses SP2, SP4, SP6, and SP8 each having a width of about ½ horizontal period (½)H are sequentially generated and are supplied to even-numbered gate lines G2, G4, G6, and G8 during a second half frame period. For this, the gate drive circuit 13 may include first and second gate drive ICs 13a and 13b formed at right and left sides of the non-display area of the liquid crystal display panel 10. Each of the first and second gate drive ICs 13a and 13b is comprised of a shift register array that is formed through the same process as the TFTs inside the liquid crystal display panel 10 in a gate-in-panel (GIP) manner. The shift register array constituting each of the first and second gate drive ICs 13a and 13b includes first to eighth stages S1 to S8 generating scan pulse. The cascade-connected odd-numbered stages S1, S3, S5, and S7 sequentially operate in response to the gate start pulse from the timing controller 11, and then the cascade-connected even-numbered stages S2, S4, S6, and S8 sequentially operate in response to an output from the last stage S7 of the odd-numbered stages, so as to sequentially generate the odd-numbered scan pulses SP1, SP3, SP5, and SP7 and then sequentially generate the even-numbered scan pulses SP2, SP4, SP6, and SP8.

The data drive IC inverts polarities of the data voltages supplied to first to fourth data lines D1 to D4 every half frame period in a frame inversion scheme in synchronization with the generation of the first odd-numbered scan pulse SP1 and the first even-numbered scan pulse SP2. Supposing that the data voltages simultaneously generated by the data drive IC have a first polarity pattern (++−−), polarities of the data voltages supplied to the first to fourth data lines D1 to D4 have the first polarity pattern during a generation period (i.e., during a first half frame period) of the odd-numbered scan pulses SP1, SP3, SP5, and SP7 and have a second polarity pattern (−−++) opposite the first polarity pattern during a generation period (i.e., during a second half frame period) of the even-numbered scan pulses SP2, SP4, SP6, and SP8. Accordingly, polarities of the data voltage displayed on the liquid crystal display panel 10 are inverted between horizontally and vertically adjacent subpixels through the TFTs connected in zigzags.

The number of changes in the polarities of the data voltages generated inside the data drive IC in the drive of the liquid crystal display panel 10 shown in FIGS. 15 to 17 is reduced to one half of the number of changes in the polarities of the data voltages generated inside the data drive IC in the drive of the liquid crystal display panel 10 shown in FIGS. 13 and 14. Therefore, the load of the data drive IC can be reduced, and heat generation and power consumption can be reduced.

As described above, in the liquid crystal display according to the embodiments of the invention, the number of input units for supplying the common voltage increases, and the common line including the longitudinal common lines and the pixel common line patterns is formed. Therefore, a reduction in the deviation of the common voltage over the entire surface of the liquid crystal display panel and a reduction in the resistance of the common line can be achieved. Further, a reduction in the image quality such as the crosstalk, the flicker, and DC image sticking caused by the distortion of the common voltage can be prevented through the distribution of the load of the common line.

Furthermore, in the liquid crystal display according to the embodiments of the invention, because each longitudinal common line receiving the common voltage is formed between not subpixels but pixels and the adjacent subpixels share the longitudinal common line, the aperture ratio increases by 10% or more as compared with the related art transverse common line. Hence, the luminance can be greatly improved.

Furthermore, in the liquid crystal display according to the embodiments of the invention, because the number of data lines is reduced to ⅔ of the number of related art data lines by assigning two data lines and two gate lines to one pixel, the number of data drive ICs can be reduced. Hence, the manufacturing cost can be greatly reduced.

Furthermore, in the liquid crystal display according to the embodiments of the invention, even if the data drive IC inverts the polarities of the data voltages every half frame period, the polarities of the data voltages can be inverted in the dot inversion scheme by using the odd-numbered scan lines sequentially driven during the first half frame period and the even-numbered scan lines sequentially driven during the second half frame period when the data voltages are displayed on the liquid crystal display panel. Hence, the number of changes in the polarities of the data voltages generated inside the data drive IC is reduced, and thus the heat generation and power consumption can be greatly reduced by reducing the load of the data drive IC depending on the number of a transition.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display comprising:
   a liquid crystal display panel including a display area where pixels are arranged in a matrix format and a plurality of data lines and a plurality of gate lines are formed to cross each other;
   an edge common line that is formed in a non-display area outside the display area to receive a common voltage through a plurality of input units;
   a plurality of pixel common line patterns that are formed along edges of each of subpixels constituting each of the pixels and are electrically connected to one another, each of the pixel common line patterns having a mesh structure, the pixel common line patterns being connected to common electrodes of the subpixels; and
   a plurality of longitudinal common lines that are electrically connected to the edge common line to apply the common voltage to the pixel common line patterns, each of the longitudinal common lines being formed between two horizontally adjacent pixels in a direction parallel to the data lines.

2. The liquid crystal display of claim 1, further comprising a plurality of data drive integrated circuits (ICs) for driving the data lines,
   wherein the plurality of input units include a plurality of common voltage input pads connected to dummy channels of each of the data drive ICs.

3. The liquid crystal display of claim 2, wherein two gate lines and two data lines are assigned to each of the pixels.

4. The liquid crystal display of claim 3, wherein the pixels include:
   a first pixel between a first gate line and a second gate line vertically adjacent to the first gate line, the first pixel including a first color subpixel, a second color subpixel, and a third color subpixel that are connected to the first and second gate lines in zigzags; and
   a second pixel between a third gate line vertically adjacent to the second gate line and a fourth gate line vertically adjacent to the third gate line, the second pixel including a first color subpixel, a second color subpixel, and a third color subpixel that are connected to the third and fourth gate lines in zigzags, the second pixel being vertically adjacent to the first pixel,
   wherein a first data line of the two data lines assigned to each pixel is formed between the first and second color subpixels of the first pixel and between the first and second color subpixels of the second pixel, and a second data line of the two data lines is formed between the second and third color subpixels of the first pixel and between the second and third color subpixels of the second pixel.

5. The liquid crystal display of claim 4, wherein the first color subpixel and the third color subpixel of the first pixel are connected to the second gate line, and the second color subpixel of the first pixel is connected to the first gate line,
   wherein the first color subpixel and the third color subpixel of the second pixel are connected to the third gate line, and the second color subpixel of the second pixel is connected to the fourth gate line.

6. The liquid crystal display of claim 5, wherein the first color subpixel of each of the first and second pixels includes:
   a first common electrode including a plurality of first fingers inclining to the data lines and a first connection portion that partially overlaps a first longitudinal common line and the pixel common line pattern to connect the first fingers to each other; and
   a first pixel electrode including a plurality of second fingers, that incline to the data lines and are opposite to the first fingers on the same plane as the first fingers, and a second connection portion that partially overlaps the pixel common line pattern to connect the second fingers to each other,
   wherein the first common electrode is connected to the first longitudinal common line through a first common electrode contact hole and is connected to the pixel common line pattern through a second common electrode contact hole.

7. The liquid crystal display of claim 6, wherein the second color subpixel of each of the first and second pixels includes:
   a second common electrode including a plurality of third fingers inclining to the data lines and a third connection portion that partially overlaps the pixel common line pattern to connect the third fingers to each other; and
   a second pixel electrode including a plurality of fourth fingers, that incline to the data lines and are opposite to the third fingers on the same plane as the third fingers, and a fourth connection portion that partially overlaps the pixel common line pattern to connect the fourth fingers to each other,
   wherein the second common electrode is connected to the pixel common line pattern through a third common electrode contact hole.

8. The liquid crystal display of claim 7, wherein the third color subpixel of each of the first and second pixels includes:
   a third common electrode including a plurality of fifth fingers inclining to the data lines and a fifth connection portion that partially overlaps a second longitudinal common line and the pixel common line pattern to connect the fifth fingers to each other; and
   a third pixel electrode including a plurality of sixth fingers, that incline to the data lines and are opposite to the fifth fingers on the same plane as the fifth fingers, and a sixth connection portion that partially overlaps the pixel common line pattern to connect the sixth fingers to each other,
   wherein the third common electrode is connected to the second longitudinal common line through a fourth common electrode contact hole and is connected to the pixel common line pattern through a fifth common electrode contact hole.

9. The liquid crystal display of claim 5, wherein the first color subpixel of each of the first and second pixels includes:
   a first common electrode including a plurality of first fingers parallel to the data lines and a first connection portion that partially overlaps a first longitudinal common line and the pixel common line pattern to connect the first fingers to each other; and
   a first pixel electrode including a plurality of second fingers, that are formed parallel to the data lines and are opposite to the first fingers on the same plane as the first fingers, and a second connection portion that partially overlaps the pixel common line pattern to connect the second fingers to each other,
   wherein the first common electrode is connected to the first longitudinal common line through a first common electrode contact hole and is connected to the pixel common line pattern through a second common electrode contact hole.

10. The liquid crystal display of claim 9, wherein the second color subpixel of each of the first and second pixels includes:
    a second common electrode including a plurality of third fingers parallel to the data lines and a third connection portion that partially overlaps the pixel common line pattern to connect the third fingers to each other; and a second pixel electrode including a plurality of fourth fingers, that are formed parallel to the data lines and are opposite to the third fingers on the same plane as the third fingers, and a fourth connection portion that partially overlaps the pixel common line pattern to connect the fourth fingers to each other, wherein the second common electrode is connected to the pixel common line pattern through a third common electrode contact hole.

11. The liquid crystal display of claim 10, wherein the third color subpixel of each of the first and second pixels includes:

a third common electrode including a plurality of fifth fingers parallel to the data lines and a fifth connection portion that partially overlaps a second longitudinal common line and the pixel common line pattern to connect the fifth fingers to each other; and a third pixel electrode including a plurality of sixth fingers, that are formed parallel to the data lines and are opposite to the fifth fingers on the same plane as the fifth fingers, and a sixth connection portion that partially overlaps the pixel common line pattern to connect the sixth fingers to each other, wherein the third common electrode is connected to the second longitudinal common line through a fourth common electrode contact hole and is connected to the pixel common line pattern through a fifth common electrode contact hole.

12. The liquid crystal display of claim 11, wherein the first color subpixel of each of the first and second pixels further includes a first transparent electrode pattern that electrically connects the first longitudinal common line to the pixel common line pattern through a first common line contact hole exposing the first longitudinal common line and a second common line contact hole exposing the pixel common line pattern, wherein the third color subpixel of each of the first and second pixels further includes a second transparent electrode pattern that electrically connects the second longitudinal common line to the pixel common line pattern through a third common line contact hole exposing the second longitudinal common line and a fourth common line contact hole exposing the pixel common line pattern.

13. The liquid crystal display of claim 5, wherein scan pulses each having a width of a half horizontal period are sequentially generated and are supplied to the gate lines, wherein the data drive IC inverts polarities of data voltages supplied to the data lines in synchronization with the generation of the scan pulses.

14. The liquid crystal display of claim 5, wherein scan pulses each having a width of a half horizontal period are sequentially generated and are supplied to odd-numbered gate lines of the gate lines during a first half frame period, and scan pulses each having a width of a half horizontal period are sequentially generated and are supplied to even-numbered gate lines of the gate lines during a second half frame period, wherein the data drive IC inverts polarities of data voltages supplied to the data lines in synchronization with the generation of a first scan pulse of the scan pulses supplied to the odd-numbered gate lines and the generation of a first scan pulse of the scan pulses supplied to the even-numbered gate lines.

15. The liquid crystal display of claim 1, wherein the edge common line and the pixel common line pattern have the same metal pattern as the gate lines, wherein the longitudinal common lines have the same metal pattern as the data lines.

16. The liquid crystal display of claim 1, wherein the longitudinal common lines comprises a plurality of first longitudinal common lines and a plurality of second longitudinal common lines, wherein the first and the second longitudinal common lines are alternately formed between a first pixel and a second pixel horizontally adjacent to the first pixel.

17. The liquid crystal display of claim 16, wherein each of the first longitudinal common lines is electrically connected to the edge common line through first and second common line contact holes.

18. The liquid crystal display of claim 17, wherein in the first common line contact hole, a portion of the edge common line not overlapping the first longitudinal common line is connected to a first connection pattern; in the second common line contact hole, a portion of the first longitudinal common line overlapping the edge common line is connected to the first connection pattern.

19. The liquid crystal display of claim 18, wherein each of the second longitudinal common lines is electrically connected to the edge common line through third and fourth common line contact holes.

20. The liquid crystal display of claim 19, wherein in the third common line contact hole, a portion of the edge common line not overlapping the second longitudinal common line is connected to a second connection pattern; in the fourth common line contact hole, a portion of the second longitudinal common line not overlapping the edge common line is connected to the second connection pattern.

21. The display of claim 1, wherein a width of the edge common line is greater than a width of the longitudinal common line.

22. The display of claim 1, wherein a width of each longitudinal common line is smaller than a width of each data line.

* * * * *